(No Model.)

G. P. FISHER.
WHEEL.

No. 492,280. Patented Feb. 21, 1893.

WITNESSES:
Fred G. Dieterich
P. B. Turpin

INVENTOR:
George P. Fisher
BY Munn & Co
ATTORNEYS

UNITED STATES PATENT OFFICE.

GEORGE P. FISHER, OF BUCYRUS, OHIO.

WHEEL.

SPECIFICATION forming part of Letters Patent No. 492,280, dated February 21, 1893.

Application filed June 11, 1892. Serial No. 436,406. (No model.)

*To all whom it may concern:*

Be it known that I, GEORGE P. FISHER, of Bucyrus, in the county of Crawford and State of Ohio, have invented a new and useful Improvement in Wheels, of which the following is a specification.

My invention is an improvement in wheels and especially in bicycle wheels and the invention consists in certain novel constructions and combinations of parts as will be hereinafter described and pointed out in the claims.

Figure 1:
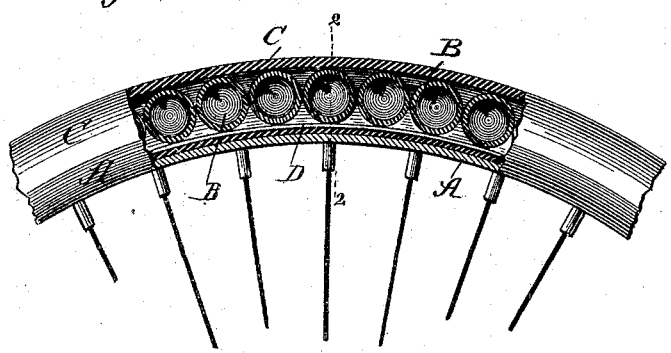
Figure 2:
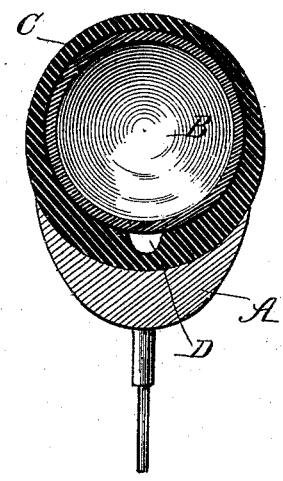

In the drawings—Figure 1 is a longitudinal section of a part of a wheel tire provided with my improvements, and Fig. 2 is a cross section on about line 2—2 of Fig. 1.

In the bicycle rim A which may be of any suitable form adapted to receive a pneumatic tire, I support a series of hollow rubber balls B arranged with each ball touching the ones on the opposite sides forming a complete circle of balls extending around the wheel. I have only shown part of a wheel but it will be understood that in practice the balls extend as stated entirely around the wheel and form in themselves a sectional pneumatic tire. These balls are imperforate and are contained in a pneumatic tube C which is held in the rim of the wheel and in practice is inflated by an air pump or in other suitable manner as may be desired.

In operation if the tube C be punctured the balls will carry the rider on and prevent the collapse of the tire. On the other hand if at any time one or more of the balls should become punctured or broken, the tube C will operate to sustain the rider and prevent the collapse of the tube. It will be noticed that the tube C fits the balls closely and serves to retain them in their desired relation against each other so that the said balls will be held from movement independently of the said tube.

The tube C is provided with an internal circumferential groove or channel D arranged preferably in its side next the rim A and operating to permit the circulation of air past the balls in filling or inflating the tube.

I claim—

1. A rim cushion for wheels composed of a series of hollow balls and a tube fitted thereon and provided with an internal circumferential groove or channel as set forth.

2. A wheel tire or rim comprising a series of hollow balls, and a tube fitted closely thereon, and provided internally with passages connecting the spaces between the balls whereby air may pass the balls to fill the spaces between the same substantially as set forth.

3. A wheel tire or rim consisting of the tube provided with the internal circumferential groove, and the balls fitted closely within the tube all substantially as set forth.

4. A wheel tire or rim comprising an annular tube having at its inner side an internal circumferential groove and provided with the hollow balls fitted in the said tube substantially as set forth.

GEORGE P. FISHER.

Witnesses:
W. H. ROEHR,
DAVID SHEALY.